United States Patent Office 3,438,883
Patented Apr. 15, 1969

3,438,883
IONIZING IRRADIATION POLYMERIZATION OF TRIOXANE
Nelson S. Marens, Silver Spring, Md., and Fred Jaffe, Cincinnati, Ohio, assignors to W. R. Grace & Co., New York, N.Y., a corporation of Connecticut
No Drawing. Continuation-in-part of application Ser. No. 274,924, Apr. 23, 1963. This application Dec. 2, 1966, Ser. No. 598,593
Int. Cl. B01j 1/10; C08f 1/16; C08g 1/04
U.S. Cl. 204—159.21        9 Claims

ABSTRACT OF THE DISCLOSURE

In abstract, this invention is directed to, a method for preparing high molecular weight fibers of polyoxymethylene which comprises preparing trioxane crystals having a length exceeding about 1 mm., irradiating said crystals with about 0.02–5.0 megarads of high energy ionizing radiation at a temperature below 25° C., aging the irradiated trioxane at about 25–60° C. for a period sufficient to allow substantial polymeric growth, and removing non-polymerized trioxane from the aged crystals, all as recited hereafter.

---

The present application is a continuation-in-part of the now abandoned Ser. No. 274,924, filed Apr. 23, 1963, which was a continuation-in-part of Ser. No. 220,539, filed Aug. 30, 1962, and 182,111, filed Mar. 23, 1962, and also is considered to be a continuation-in-part of Ser. No. 118,511, filed June 21, 1961.

The present invention relates to fibrous organic polymers, and more specifically to a novel polyoxymethylene polymer and fiber, and to a method for its preparation.

High molecular weight polyoxymethylene has long been recognized as a useful polymer for the fabrication of numerous shaped articles having relatively large dimensions. However, it is generally found that small dimension dilaments and fibers may not be successfully obtained using conventional melt and solution spinneret techniques because of the excessive melt viscosity and low solubility possessed by high molecular weight polyoxymethylene. When attempts are made to form filaments or fibers using solutions or melts of high molecular weight polyoxymethylene, the excessively high temperatures required to melt or to dissolve substantial amounts of polymer cause excessive degradation of the polymer which in turn hinders the formation of satisfactory filaments or fibers.

It is, therefore, an object of the present invention to provide a novel fibrous polyoxymethylene not heretofore obtained by prior art processes.

It is another object to provide a novel high molecular weight high density polyoxymethylene fiber having an extremely small cross section dimension.

It is a further object to provide an improved method by which highly crystalline polyoxymethylene fibers of extremely small cross section may be obtained.

It is still a further object to provide a method by which trioxane may be directly polymerized into a useful polyoxymethylene fiber of high molecular weight and high crystallinity which does not utilize prior art melt or solution spinneret techniques.

These and still further objects of the present invention will become readily apparent to one skilled in the art from the following detailed description and specific examples.

In general, the present invention involves the irradiation of crystalline trioxane with high energy ionizing irradiation to obtain a substantial amount of polyoxymethylene formation within the trioxane crystal, and subsequently removing non-polymerized trioxane from the trioxane crystal to obtain a fibrous polyoxymethylene, the fibers of which extend substantially the length of the original trioxane crystal. The fibers obtained by this method possess a diameter of less than about 2 microns and may be prepared in a length which is limited only by the length of the original trioxane crystal. These novel polyoxymethylene fibers, when examined by a standard X-ray crystallographic technique, are found to possess an identity period of 14 A. along the fiber axis. That is, within experiment variations the identity distances found for the present fibrous polyoxymethylene polymer are equal to or submultiples of an identity period of 14 A. On the other hand, it is generally known that polyoxymethylene polymers formed by conventional prior art methods, i.e., chemical and sublimation polymerization methods, possess an identity period of 17 A. along the fiber axis.

Regardless of the reason why the present fibrous polyoxymethylene polymer possesses a different identity period along the fiber axis than that of prior art material, it is found that the present polymer possesses other characteristics that distinguish it over that material previously prepared. The present fibrous polymers generally possess higher melting points (185–200° C.) than prior art polyoxymethylene which normally melts at about 180° C.

More specifically, the present invention contemplates an extremely fine fibrous polyoxymethylene of high molecular weight which has a cross-section diameter of less than about 2 microns and an identity period of about 14 A. when measured along the fiber axis which is produced by a process involving (1) forming a crystalline trioxane mass which is comprised of crystal having a length at least equal to the length of the ultimately desired fiber; (2) irradiating the crystalline trioxane to a dosage of from about 0.001 to about 10 megarads with high energy ionizing radiation while maintaining the temperature of the trioxane at from about 0° C. to just below its melting point; (3) preferably holding or aging the irradiated trioxane at a temperature of from about 25° C. to about 62° C. for a time sufficient to develop polymerization of the irradiated trioxane to a desired degree; and (4) removing non-polymerized trioxane from the polymerized mass whereupon a fibrous high crystalline polyoxymethylene is obtained the fiber structure of which is generally oriented along the axis of the initial trioxane crystal and extends essentially the length thereof.

In the generally preferred embodiment of the invention, the irradiation is most conveniently carried out at about room temperature, i.e. around 25° C. and subsequent polymerization is done at about 55–62° C. which represents a temperature range just below the melting point of the trioxane crystal. In order to minimize the possibility of oxidation occurring at the activated polymerization sites of the irradiated trioxane, the irradiation and aging of the trioxane may be carried out in an inert atmosphere, which may be provided by an inert gas or vacuum; however, it has also been found that satisfactory results may generally be obtained in the process carried out in air.

The crystalline trioxane used in the practice of the present invention may be obtained by any one of the numerous ways known in the art. For example, a sample of powdered or granular trioxane may be heated to above its melting point and permitted to cool at room temperature. Crystals varying from 30 to 300 mm. in length may be easily obtained in this manner. Another convenient means for obtaining trioxane crystals involves the subliming or distilling of trioxane above its melting point and permitting the vapors evolving therefrom to condense upon a cool surface. Crystals over 50 cm. in length may be obtained by following this procedure.

Following the general conditions set forth above, it is found that the polyoxymethylene polymer is obtained in yields varying from about 5 to about 80%. The melting points of these polymers vary from about 185–200° C. The reduced specific viscosities (RSV) of the polymer as determined at 135° C. using 0.1 g. of polymer per 100 ml. of stabilized butyrolactone solvent containing 0.5% of 4,4′ thiobis (6-tert-butyl-orthocresol) and 0.5% 2,6 di-tert-butyl-p-cresol vary from about 0.05 to about 4.0 deciliters/g. (dig.−1).

Removal of the non-polymerized trioxane, which results in the freeing or liberating of the polyoxymethylene fibers from the crystalline mass may be conveniently done by leaching the polymerized mass with a solvent for the non-polymerized trioxane. Suitable solvents are water, methanol, and acetone.

An alternative method for removing the non-polymerized trioxane involves evaporating the trioxane at room or elevated temperature with or without the use of reduced pressure. This latter method permits the unreacted trioxane to be collected and recycled in the process without intermediate drying and results in a perfectly dried fibrous product.

It is generally found that no appreciable polymerization, i.e. polymer propagation occurs at temperatures below about 25° C. Hence, in the practice of the present invention activated sites or polymerization initiating sites may be induced in the trioxane at below 25° C. without any readily measurable polymerization occurring at the time of irradiation. Such a procedure permits distribution of the desired number of activated sites in the trioxane before the propagation of polymerization which is brought about by merely raising the temperature to above 25° C. By deferring polymerization until after activation by irradiation is completed, all activated specie commence to grow at the same instant. It is also noted that if radiation continues during polymerization, chain scissioning will also occur.

Ionizing irradiation which may be used in the practice of the present invention may be high energy electrons such as obtained from a Van de Graaff electron accelerator, positive ions such as protons, alpha particles, deuterons and neutrons. Effective irradiation may also be supplied from radioactive isotopes or an atomic pile which would include X-rays and gamma rays.

The amount of high energy ionizing radiation which is employed in irradiating the trioxane of the present invention may vary between 0.001 and 10.0 megarads. Preferably, however, low radiation dosages of less than about 5 megarads are generally preferred. Lower radiation dosages in a range from 0.02 to 1.0 megarads may frequently be used with excellent economic advantage in that they decrease the cost of irradiating materials and also they prevent undue heating of the crystalline trioxane monomer. Variations in dose rates do not appear to affect the molecular weight of the final polymer nor do they affect the yield as long as the irradiation temperature is maintained below the propagation temperature of about 25° C. In a preferred embodiment of the present invention radiation is carried out at a temperature below the propagation temperature of about 30° C. However, the present invention may be practiced by irradiating in excess of 30° C. wherein polymer propagation or growth occur simultaneously with irradiation.

Having described the essential aspects of the present invention, the following specific examples are given to illustrate the specific embodiments thereof.

Example I

Trioxane crystals varying in length from about 30 to 300 mm. were prepared by condensing trioxane vapor upon a cool surface. The crystals were subjected to a dosage of 0.3 megarad using 2.0 mev. electrons as produced by a Van de Graaff electron accelerator. The irradiation was carried out under one atmosphere of nitrogen and at room temperature. Aging was done at 55° C. for varying periods. The percent polymer yield and reduced specified vescosity of the samples obtained in this manner are given in the table below:

| Sample | Percent polymerization | Age (hrs.) | RSV |
|---|---|---|---|
| 1 | 21.6 | 0.5 | 1.19 |
| 2 | 29.3 | 1.0 | 1.48 |
| 3 | 37.4 | 2.0 | 1.62 |
| 4 | 48.1 | 4.0 | 1.88 |

The crystalline masses obtained above were allowed to evaporate at room temperature and pressure overnight. The resultant products appeared as long bundles of snow white fibers which varied in length according to the length of the initial trioxane crystals which were from 30 to 300 mm. Photomicrographs of the fibers indicated that the ultimate fiber diameters were under 2 microns. The fibers had a high degree of crystallinity, and flexibility and could easily be separated from the initial mass with a minimum of mechanical force.

Example II

Trioxane was distilled into a gas tube under an atmosphere of dry nitrogen. The liquid trioxane was permitted to solidify at room temperature whereupon an amorphous mass of white crystalline material was obtained. Samples were irradiated to 10, 5, and 2 megarads respectively and permitted to age at room temperature and at 55° C. for varying periods of time. The table below indicates the percentage yield of polymer obtained and the respective reduced specific viscosities thereof.

| Sample | Mr. | Aging (days) | Percent polymerization aging at 25° C. | Percent polymerization aging at 55° C. | RSV, 25° C., aging | RSV, 55° C., aging |
|---|---|---|---|---|---|---|
| 1 | 10 | 7 | 86.6 | 19.6 | 0.04 | 0.05 |
| 2 | 5 | 4 | 71.5 | 95.1 | 0.04 | 0.05 |
| 3 | 2 | 2 | 79.8 | 96.5 | 0.18 | 0.16 |

The fibrous material obtained in the above samples varied in lengths from somewhat less than 1 mm. up to about 3 mm. The sample which attained the highest degree of irradiation appeared to possess the shortest fiber length while the sample receiving the least amount of irradiation possessed the longest fiber length.

Example III

This specific example illustrates that the present radiation polymerized polyoxymethylene possesses a novel crystalline arrangement.

A crystal trioxane was sealed in an evacuated capillary tube, and then subjected to 0.3 megarad of 2 mev. electrons. This irradiated trioxane was held at room temperature for 25 hours, and then heated at 55° C. for 0.5 hour whereupon polymerization took place. A fibrous crystalline polymeric structure which was oriented along the axis of the initial trioxane crystal was obtained.

The X-ray diffraction pattern of the polymer was then determined using a standard technique which is generally disclosed in M. J. Buerger, X-ray Crystallograph (1942). In the specific studies disclosed herein the X-ray radiation used was the K-alpha doublet of copper. A rotating-crystal X-ray camera, having a 5.73 cm. radius, as manufactured by Charles Supper Co. of Newton Center, Mass., was used to record the diffraction pattern. The polymer material was mounted in a manner that positioned the polymer fibers coaxial with the rotational axis of the camera, and a diffraction pattern photograph was prepared. The distances (Y) from the undiffracted spot on the photograph to each series of diffracted spots were measured.

Using the relation $$T = \text{lambda}/\sin \tan^{-1}(Y/R)$$

where lambda is the wavelength of the radiation (1.543 A.) and R is the radius of the camera (5.73 cm.), identity distances T were calculated from the measured values of Y. The values obtained for T are given below.

Identity distances:  A.
13.9 — ±0.5
7.0 — ±0.2
4.64 — ±0.09
3.49 — ±0.07

Examination of the above data indicates that, within experimental variations, the identity distances found were equal to or submultiples of an identity period of 14 A. along the polymeric fiber axis. Polyoxymethylene prepared by conventional chemical polymerization techniques possesses an identity period of about 17 A.

The irradiated sample which was aged at 55° C. for 4 hours yielded the same diffraction pattern.

The above specific examples clearly indicate that a fibrous polyoxymethylene may be readily obtained through irradiation of trioxane crystals. While fiber length is controlled by varying the length of the initial trioxane crystal, it is seen the fiber diameter will remain consistently below about 2 microns. The present fiberous polymers when ground to a length of less than about 50 microns are excellent thickening agents for polyester and epoxy resins.

We claim:

1. A method for preparing high molecular weight fibers of polyoxymethylene which comprises preparing trioxane crystals having a length exceeding about 1 mm., irradiating the trioxane crystals with from about 0.02 to 5.0 megarads of high energy ionizing radiation at a temperature below 25° C., aging the irradiated trioxane at a temperature of about 25 to 60° C. for a period sufficient to allow substantial polymeric growth, and removing non-polymerized trioxane from said aged trioxane crystals.

2. The method of claim 1 wherein said irradiated crystals are aged for a period of from about 0.5 to 170 hours at a temperature from 25 to 62° C.

3. The method of claim 1 wherein said trioxane crystals are prepared by heating a mass of trioxane to about its melting point, and cooling at about room temperature to affect crystallization thereof.

4. The method of claim 1 wherein said trioxane crystals are prepared by vaporizing trioxane, and condensing the vaporized trioxane on a surface maintained at a temperature below the solidification temperature of said trioxane.

5. The method of claim 1 wherein said non-polymerized trioxane is removed by means selected from the group consisting of washing with a solvent for said trioxane and evaporation.

6. A method for preparing a useful, high molecular weight, fine, fibrous polyoxymethylene, comprising;
   (a) preparing trioxane crystals having a length of 30–300 mm. by condensing trioxane vapor on a cool surface;
   (b) distributing activation sites in the trioxane crystals by irradiating said crystals with about 0.001–10 megarads of high energy ionizing radiation while maintaining the temperature of said crystals below 25° C.;
   (c) polymerizing the irradiated trioxane to form high molecular weight polyoxymethylene by againg the irradiated trioxane crystals at about 25–62° C. for a time sufficient to develop polymerization of the irradiated trioxane to a desired degree; and
   (d) liberating the high molecular weight polyoxymethylene from non-polymerized trioxane by removing the non-polymerized trioxane with a solvent selected from the group consisting of water, methanol, and acetone, said polyoxymethylene being in the form of fine fibers, having; (i) a fiber axis; (ii) an identity period of 14 A. along said axis; (iii) a diameter of less than about 2 microns; (iv) a length of 30–300 mm.; (v) a high degree of crystallinity and flexibility; (vi) a melting point of 185–200° C.; and (vii) a reduced specific viscosity of about 0.05–4.0 deciliters/g., the yield of said high molecular weight polyoxymethylene being about 5–80%.

7. A method for preparing a useful, high molecular weight, fine, fibrous polyoxymethylene, comprising:
   (a) preparing trioxane crystals having a length of 30–300 mm. by melting solid trioxane and permitting the melted trioxane to cool to room temperature;
   (b) distributing activation sites in the trioxane crystals by irradiating said crystals with about 0.001–10 megarads of high energy ionizing radiation while maintaining the temperature of said crystals below 25° C.;
   (c) polymerizing the irradiated trioxane to form high molecular weight polyoxymethylene by aging the irradiated trioxane crystals at about 25–62° C. for a time sufficient to develop polymerization of the irradiated trioxane to a desired degree; and
   (d) liberating the high molecular weight polyoxymethylene from non-polymerized trioxane by removing the non-polymerized trioxane with a solvent selected from the group consisting of water, methanol, and acetone, said polyoxymethylene being in the form of fine fibers, having; (i) a fiber axis; (ii) an identity period of 14 A. along said axis; (iii) a diameter of less than about 2 microns; (iv) a length of 30–300 mm.; (v) a high degree of crystallinity and flexibility; (vi) a melting point of 185–200° C.; and (vii) a reduced specific viscosity of about 0.05–4.0 deciliters/g., the yield of said high molecular weight polyoxymethylene being about 5–80%.

8. A method for preparing a useful, high molecular weight, fine, fibrous polyoxymethylene, comprising:
   (a) preparing trioxane crystals having a length of 30–300 mm. by melting solid trioxane and permitting the melted trioxane to cool to room temperature;
   (b) distributing activation sites in the trioxane crystals by irradiating said crystals with about 0.001–10 megarads of high energy ionizing radiation while maintaining the temperature of said crystals below 25° C.;
   (c) polymerzing the irradiated trioxane to form high molecular weight polyoxymethylene by aging the irradiated trioxane crystals at about 25–62° C. for a time sufficient to develop polymerization of the irradiated trioxane to a desired degree; and
   (d) liberating the high molecular weight polyoxymethylene from non-polymerized trioxane by evaporating the non-polymerized trioxane from the polyoxymethylene, said polyoxymethylene being in the form of fine fibers, having; (i) a fiber axis; (ii) an identity period of 14 A. along said axis; (iii) a diameter of less than about 2 microns; (iv) a length of 30–300 mm.; (v) a high degree of crystallinity and flexibility; (vi) a melting point of 185–200° C.; and (vii) a reduced specific viscosity of about 0.05–4.0 deciliters/ g., the yield of said high molecular weight polyoxymethylene being about 5–80%.

9. A method for preparing a useful, high molecular weight, fine, fibrous polyoxymethylene, comprising:
   (a) preparing trioxane crystals having a length of 30–300 mm. by condensing trioxane vapor on a cool surface;
   (b) distributing activation sites in the trioxane crystals by irradiating said crystals with about 0.001–10 megarads of high energy ionizing radiation while maintaining the temperature of said crystals below 25° C.;
   (c) polymerizing the irradiated trioxane to form high molecular weight polyoxymethylene by aging the irradiated trioxane crystals at about 25–62° C. for a time sufficient to develop polymerization of the irradiated trioxane to a desired degree; and
   (d) liberating the high molecular weight polyoxymethylene from non-polymerized trioxane by evaporating the non-polymerized trioxane from the polyoxymethylene, said polyoxymethylene being in the form of fine fibers, having; (i) a fiber axis; (ii) an identity period of 14 A. along said axis; (iii) a diameter of less than about 2 microns; (iv) a melting point of 185–200° C.; and (vii) a reduced specific viscosity of about 0.05–4.0 deciliters/g., the yield of said high molecular weight polyoxymethylene being about 5–80%.

References Cited

UNITED STATES PATENTS

| | | | |
|---|---|---|---|
| 3,305,464 | 2/1967 | Marans et al. | 204—159.21 |
| 3,347,764 | 10/1967 | Matsumoto et al. | 204—159.21 |
| 3,366,561 | 1/1968 | Marans | 204—159.21 |

OTHER REFERENCES

Hayashi et al., Die Makromolekulare Chemie, 47 #2/3 (1961), pp. 230–236.

WILLIAM H. SHORT, *Primary Examiner.*

L. M. PHYNES, *Assistant Examiner.*

U.S. Cl. X.R.

260—67